United States Patent
Venkamsetty et al.

(10) Patent No.: US 10,382,441 B2
(45) Date of Patent: Aug. 13, 2019

(54) CROSS SECURITY LAYER SECURE COMMUNICATION

(71) Applicant: Honeywell International Inc., Morris Plains, NJ (US)

(72) Inventors: Venkata Rao Venkamsetty, Bangalore (IN); Boyd Knutson, Glendale, AZ (US); Kishen Manjunath, Bangalore (IN); Karthick Sengodan, Salem (IN); Thangadurai Narayanan, Madurai (IN); Blaine Brysh, Edmonton (CA)

(73) Assignee: Honeywell International Inc., Morris Plains, NJ (US)

( * ) Notice: Subject to any disclaimer, the term of this patent is extended or adjusted under 35 U.S.C. 154(b) by 255 days.

(21) Appl. No.: 15/293,212

(22) Filed: Oct. 13, 2016

(65) Prior Publication Data

US 2018/0109524 A1   Apr. 19, 2018

(51) Int. Cl.
*H04L 29/06* (2006.01)

(52) U.S. Cl.
CPC .............. *H04L 63/10* (2013.01); *H04L 63/08* (2013.01); *H04L 63/0807* (2013.01); *H04L 63/0823* (2013.01); *H04L 63/0869* (2013.01); *H04L 63/101* (2013.01); *H04L 63/105* (2013.01); *H04L 63/20* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 7,992,199 B1 | 8/2011 | Winick et al. | |
| 8,181,010 B1 * | 5/2012 | Uchil | H04L 63/0209 380/278 |
| 8,892,135 B2 | 11/2014 | Werb et al. | |
| 2004/0006710 A1 | 1/2004 | Pollutro et al. | |
| 2004/0030531 A1 | 2/2004 | Miller et al. | |
| 2007/0297613 A1 | 12/2007 | Ghosh | |
| 2009/0034441 A1 | 2/2009 | Budampati et al. | |
| 2009/0086692 A1 | 4/2009 | Chen | |
| 2009/0113202 A1 | 4/2009 | Hidle | |
| 2009/0222885 A1 * | 9/2009 | Batke | H04L 63/061 726/1 |
| 2014/0075568 A1 | 3/2014 | Sathyadevan et al. | |
| 2015/0077224 A1 | 3/2015 | Pal | |

OTHER PUBLICATIONS

International Search Report and Written Opinion of the International Searching Authority for PCT Patent Application No. PCT/US2017/055493 dated Jan. 12, 2018, 11 pages.

* cited by examiner

*Primary Examiner* — Andrew J Steinle

(57) ABSTRACT

A security layer in an industrial control and automation system includes a user database, a web server, a secure token server (STS), and an application server. The user database is configured to store identities of users with credentials to access controls of the security layer. The web server is configured to identify an operator using a client device. The STS is configured to authenticate the operator for the security layer. The application server is configured to negotiate access for the client device for a target application server in a target security layer.

17 Claims, 5 Drawing Sheets

US 10,382,441 B2

CROSS SECURITY LAYER SECURE COMMUNICATION

TECHNICAL FIELD

This disclosure relates generally to secure communication. More specifically, this disclosure relates to secure communication across security layers in an industrial control system.

BACKGROUND

Industrial control systems (ICS) follow a layered network architecture based on Purdue model—L1 to L5 network levels/security layers. Typically, there is no domain trust between levels. For example, L4 security layer will have a domain controller that is not trusted by L3 security layer domain controller and vice versa. Based on these security layers separations, a user at the L4 security layer is not trusted (not identifiable) at the L3 security layer and vice versa. In ICS systems, users are typically not permitted to cross layers.

SUMMARY

This disclosure provides secure communication across security layers in an industrial control system.

In a first embodiment, a security layer in an industrial control and automation system is provided. The security layer includes a user database, a web server, a secure token server (STS), and an application server. The user database is configured to store identities of users with credentials to access controllers of the security layer. The web server is configured to identify an operator using a client device. The STS is configured to authenticate the operator for the security layer. The application server is configured to negotiate access for the client device for a target application server in a target security layer In a second embodiment, an industrial control and automation system is provided. The system includes a target security layer and a security layer. The target security layer includes a target STS and a target application server. The security layer includes a user device, a web server, an STS, and an application server. The user database is configured to store identities of users with credentials to access controllers of the security layer. The web server is configured to identify an operator using a client device. The STS is configured to authenticate the operator for the security layer. The application server is configured to negotiate access of the client device for the target application server in the target security layer.

In a third embodiment, a method for secure communication across security layers in an industrial control system is provided. The method includes identifying, using a web server, an operator using a client device to access a target controller in a target security layer. The method also includes authenticating, using a secure token server (STS), an operator of the client device for accessing a target application server in a target security layer. The method further includes negotiating, using an application server, access for the client device for a target application server in a target security layer.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 5, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any type of suitably arranged device or system.

Secure communication across security layers can require considerable amount of development and maintenance time/resources. Replicating data across layers securely and installing the same software across domains increases the footprint of installation and the total cost of ownership (licenses, maintenance, and the like). Setting up a trusted subsystem model in which authorization has to be based on the identity of the trusted subsystem and not the actual user accessing the resource does not meet security and legal requirements of most industrial control and automation systems.

Claims based solutions are based on open standards like OpenIDConnect, OAuth2.0, and the like. The uniqueness of claims based solutions is in how the open standards are adopted to address the problems in secure communication across security layers, especially when user calls are routed via services to access resources in another security layer.

For example, both L3 and L4 networks maintain their own security layers or zones. L3 and L4 security layers can define a security token service that is able to translate a user identity into a token that is signed, encrypted and transmitted across security layers with the request. The token is used by a corresponding security subsystem that first validates the token and then authorizes the request for the required resource based on the user identity from the originating security layer. The L3 security layer authorizes the L4 user based on the information provided in the token. This gives the L3 security layer administrator control over the L4 user's access to L3 resources and control to access based on specific user identities reducing the exposed attack surface as the token-based approach allows access to specific resources controlled by security subsystem in the L3 security layer.

Figure 1:
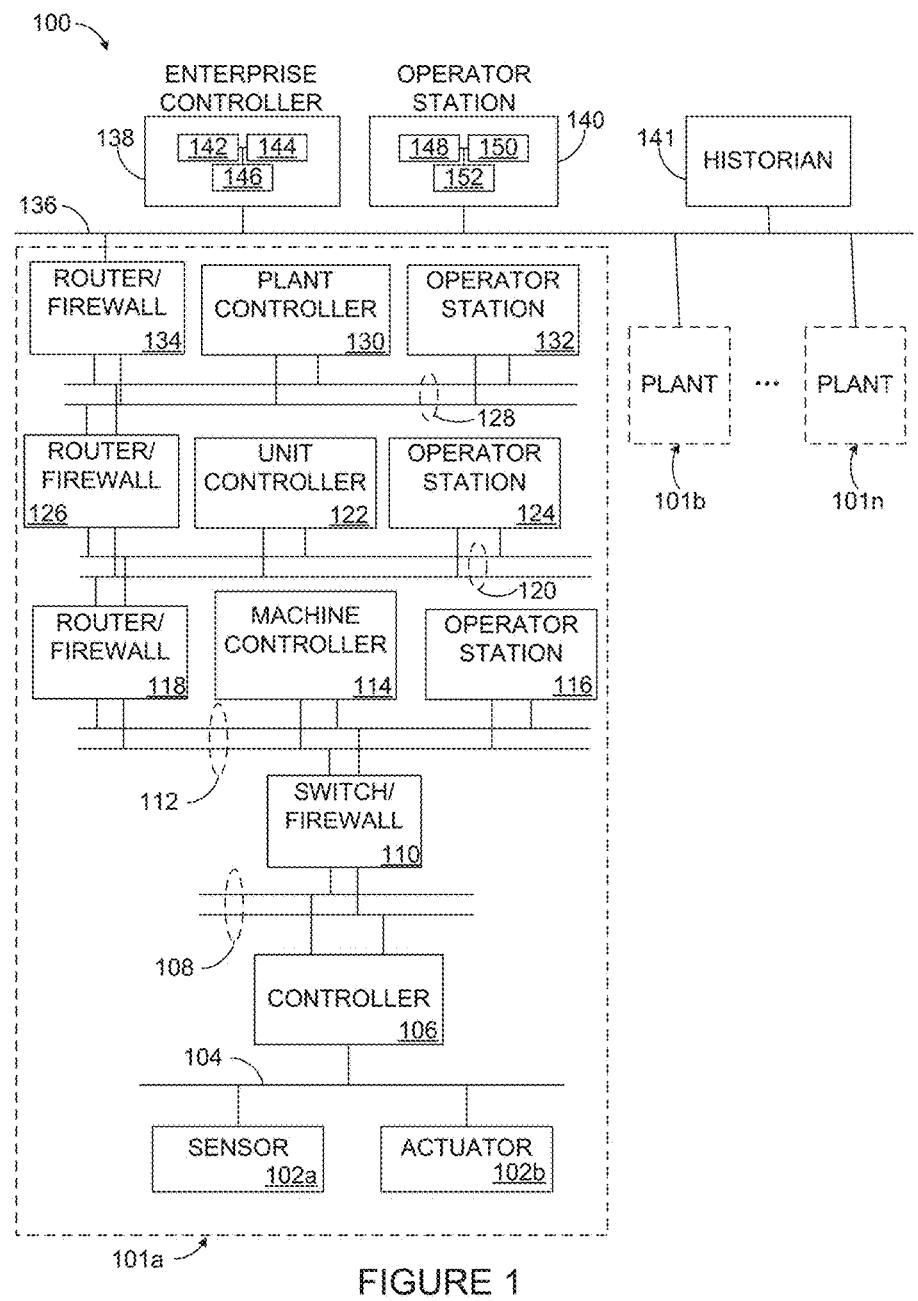
FIG. 1 illustrates an example industrial control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, flow rate, or a voltage transmitted through a cable. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS (FF) network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In accordance with this disclosure, various components of the system 100 support a process for secure communication across security layers in an industrial process control and automation system 100. For example, one or more of the operator stations 132 could be authenticated for secure communication with unit controller 122 or machine controller 114, as described in greater detail below.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs.

Figure 2:
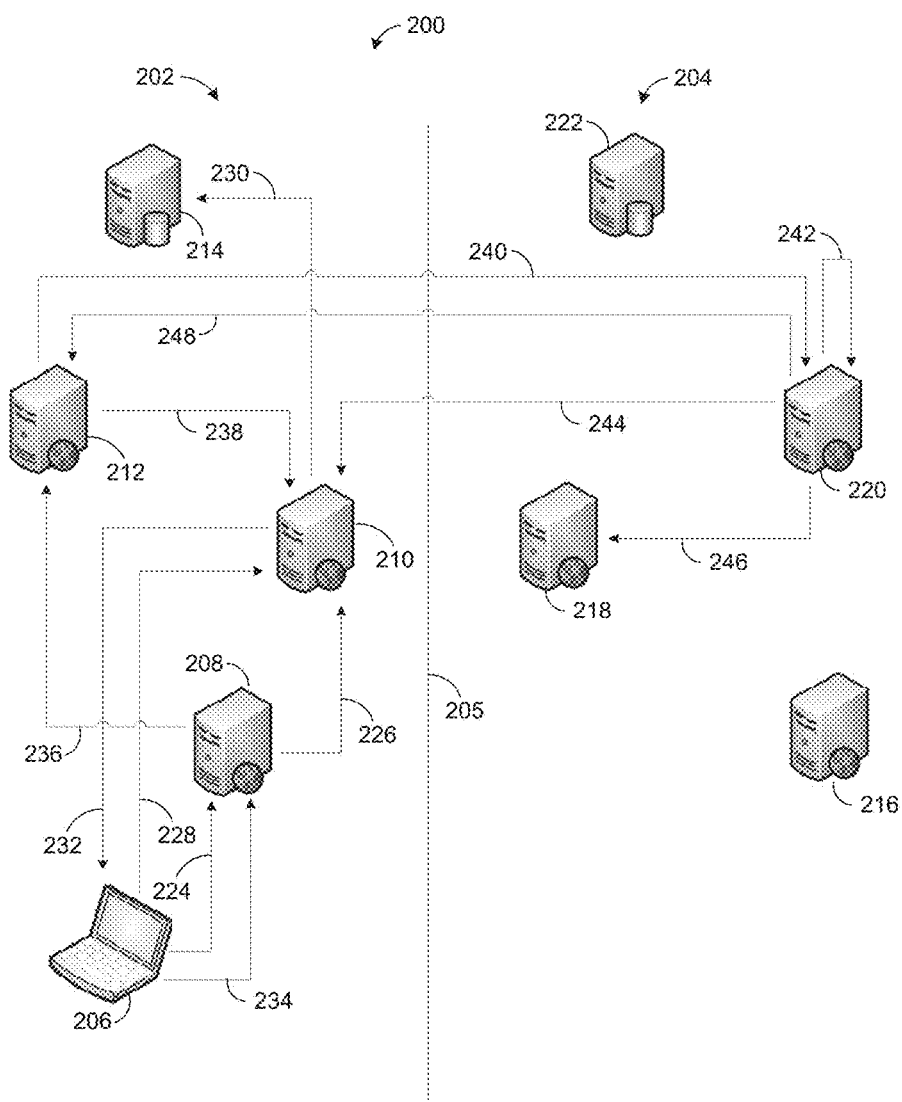
FIG. 2 illustrates an example of secure communication across security layers according to this disclosure.

FIG. 2 illustrates an example secure communication 200 across security layers according to this disclosure. The embodiment of secure communication 200 across security layers illustrated in FIG. 2 is for illustration only. FIG. 2 does not limit the scope of this disclosure to any particular implementation.

The secure communication 200 occurs over a security layer 202 and a target security layer 204. In the illustration of the secure communication 200, the security layer 202 and the target security layer 204 are divided by the layer boundary 205. The security layer 202 can represent any layer or level from the Purdue model in an industrial control and automation system. For example, the security level 202 can include components associated with Level 4 of the Purdue model. The target security layer 204 can represent any layer or level other than the security layer 202. For example, the target security layer 204 can include components associated with Level 3 of the Purdue model. The security layer 202 includes a web server 208, a secure token server (STS) 210, an application server 212, and a user database 214. The target security layer 204 includes a target web server 216, a target STS 218, a target application server 220, and a target user database 222. The web server 208 and the target web server 216 are used for a client device 206 to initially access a specific security layer. The STS 210 and the target STS 218 authorize access to the respective security layers by generating access tokens for the specific layer that the STS is located on. For example, the STS 210 generates access tokens for the security layer 202 and the target STS 218 generates access tokens for the target security layer 204. The application server 212 and the target application server 220 execute applications for the respective security layers. The user database 214 and target user database 222 store the security credentials for operators that are granted access to the respective security layers.

The web server 208 identifies an operator using a client device 206 to access a target controller in a target security layer 204. In operation 224, the client device 206 attempts to access an application on a target security layer 204. Once the web server 208 receives an attempt to access the application, the web server 208 initiates STS authentication of the client device 206 with the STS in operation 226. The web server 208 communicates with the STS 210 in order to perform operator identification when the client device 206 initially accesses the security layer 202. The web server 208 responds to the access attempt by redirecting the client device 206 to communicate with the STS 210 in operation 228.

The STS 210 authenticates an operator of the client device 206 for accessing an application server 212 in the security layer 202. The STS 210 authenticates the operator of the client device 206 by comparing the operator with an identity in the user database 214 in operation 230. The user database 214 stores the identities of the users with credentials to access the controllers of the security layer 202. Once the STS 210 authenticates the operator with the user credentials, the STS 210 provides an identity token to the client device 206 in operation 232. The client device 206 transmits the identity token to the web server 208 in operation 234. The web server 208 uses the identity token received from the client device 206 and prepares an access token corresponding to the client device 206. The web server 208 provides the access token to the application server 212 in operation 236. The application server 212 uses the access token to communicate with the STS 210 for authentication of the client device 206 for the security layer 202 in operation 238.

Once the client device 206 is authenticated at the application server 212 and a target application server 220 negotiate for the client device 206 to access a target application server 220 in a target security layer 206. The application server 212 transmits the access token to the target application server 220 in operation 240. The target application server 220 access the security layer claims from the access token and maps the security layer claims to the target security claims based on the configurations of the security layer 202 and the target security layer 204 in operation 242. The target application server 220 authenticates the client device 206 using the access token with the STS 210 in operation 244. Once the client device 206 is authorized with the STS 210 on the security layer 202, the target application server authenticates the client device 206 with the target STS 218 in operation 246. Once the target application server 220 receives authentication from the target STS 218, the target application server 220 transmits a response to the request to access the controllers of the target security layer 204 in operation 248. The target application server 220 allows the client device 206 access to the controllers of the target security layer 204.

Although FIG. 2 illustrates an example of a secure communication 200, various changes may be made to FIG. 2. For example, while a configuration of the components is illustrated in FIG. 2, other embodiments can include more or fewer components.

Figure 3:
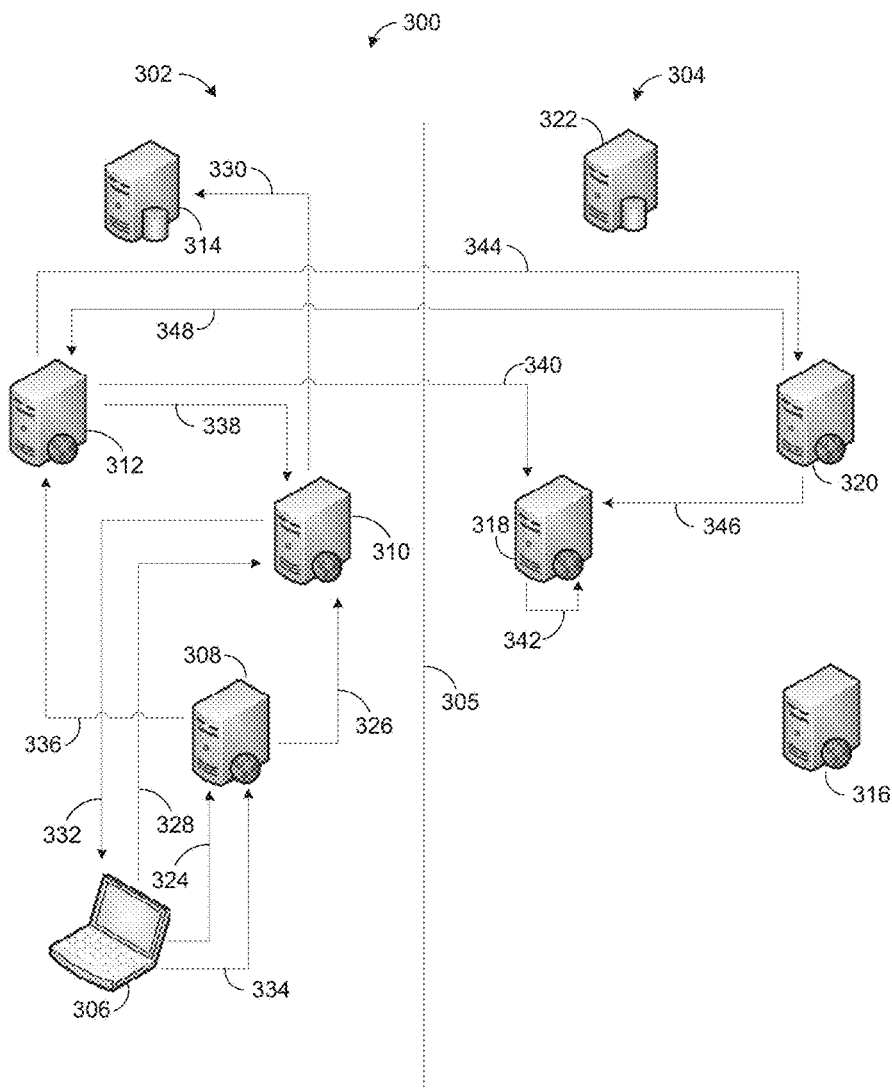
FIG. 3 illustrates another example of secure communication across security layers according to this disclosure.

FIG. 3 illustrates another example secure communication 300 across security layers according to this disclosure. The embodiment of secure communication 300 across security layers in FIG. 3 is for illustration only. FIG. 3 does not limit the scope of this disclosure to any particular implementation.

The secure communication 300 occurs over a security layer 302 and a target security layer 304. In the illustration of the secure communication 300, the security layer 302 and the target security layer 304 are divided by the layer boundary 305. The security layer 302 can represent any layer from the Purdue model in an industrial control and automation system. The target security layer 304 can represent any layer other than the security layer 302. The security layer 302 includes a web server 308, an STS 310, an application server 312, and a user database 314. The target security layer 304 includes a target web server 316, a target STS 318, a target application server 320, and a target user database 322. The STS 310 and the target STS 318 authorize access to the respective security layers by generating access tokens for the specific layer that the STS is located on. For example, the STS 310 generates access tokens for the security layer 302 and the target STS 318 generates access tokens for the target security layer 304. The applications server 312 and the target application server 320 execute applications for the respective security layers. The user database 314 and target user database 322 store the security credentials for operators that are granted access to the respective security layers.

The web server 308 identifies an operator using a client device 306 to access a target controller in a target security layer 304. In operation 324, the client device 306 attempts to access an application on a target security layer 304. Once the web server 308 receives an attempt to access the application, the web server 308 initiates STS authentication of the client device 306 with the STS in operation 326. The web server 308 communicates with the STS 310 in order to perform operator identification when the client device 306 initially accesses the security layer 302. The web server 308 responds to the access attempt by redirecting the client device 306 to communicate with the STS 310 in operation 328.

The STS 310 authenticates an operator of the client device 306 for accessing an application server 312 in the security layer 302. The STS 310 authenticates the operator of the client device 306 by comparing the operator with an identity in the user database 314 in operation 330. The user database 314 stores the identities of the users with credentials to access the controllers of the security layer 302. Once the STS 310 authenticates the operator with the user credentials, the STS 310 provides an identity token to the client device 306 in operation 332. The client device 306 transmits the identity token to the web server 308 in operation 334. The web server 308 uses the identity token received from the client device 306 and prepares an access token corresponding to the client device 306. The web server 308 provides the access token to the application server 312 in operation 336. The application server 312 uses the access token to communicate with the STS 310 for authentication of the client device 306 for the security layer 302 in operation 338. Once the client device 306 is authenticated at the application server 312, the application server 312 transmits the access token for the security layer 302 to the target STS 318 in the target security layer in operation 340.

The target STS 318 validates the client device 306 or application server 312 for the target security layer 304. The target STS 318 also validates the token by determining whether the token is issued by the STS 310, where the target STS 318 trusts the STS 310. The target STS 318 receives the access token for the security layer 302 and validates a target access token for the target security layer 304 in operation 342. The target STS 318 transmits the target access token back to the application server 312.

The application server 312 and the target application server 320 negotiate for the client device 306 to access the target application server 320 in the target security layer 304. The application server 312 receives the target access token and transmits the target access token to the target application server 320 in operation 344. The target application server 320 authenticates the client device 306 with the target STS 318 in operation 346. Once the target application server 320 receives authentication from the target STS 318, the target application server 320 transmits a response to the request to access the controllers of the target security layer 304 in operation 348. The target application server 320 allows the client device 306 access to the controllers of the target security layer 304.

Although FIG. 3 illustrates an example of a secure communication 300 across security layers, various changes may be made to FIG. 3. For example, while a configuration of the components is illustrated in FIG. 3, other embodiments can include more or fewer components.

Figure 4:
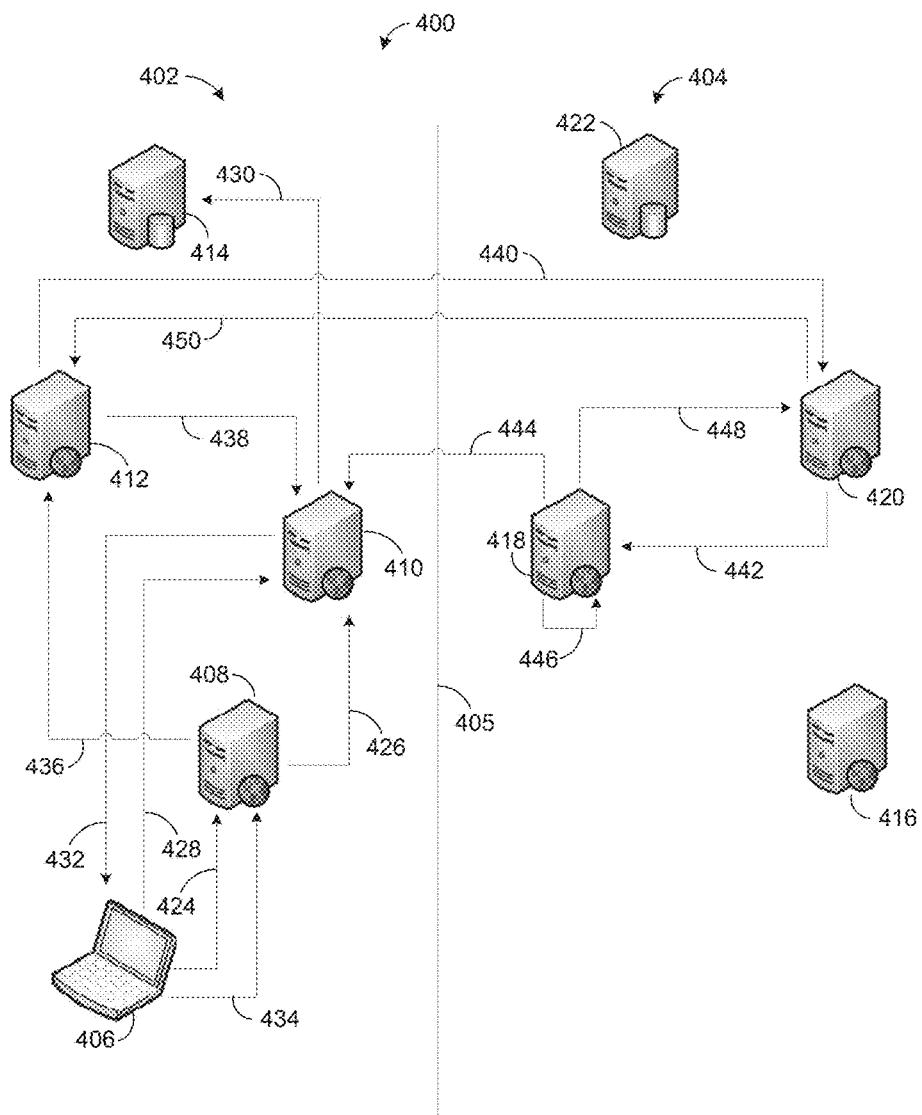
FIG. 4 illustrates a further example of secure communication across security layers according to this disclosure.

FIG. 4 illustrates another example secure communication 400 across security layers according to this disclosure. The embodiment of secure communication 400 across security layers in FIG. 4 is for illustration only. FIG. 4 does not limit the scope of this disclosure to any particular implementation.

The secure communication 400 occurs over a security layer 402 and a target security layer 404. In the illustration of the secure communication 400, the security layer 402 and the target security layer 404 are divided by the layer boundary 405. The security layer 402 can represent any layer from the Purdue model in an industrial control and automation system. The target security layer 404 can represent any layer other than the security layer 402. The security layer 402 includes a web server 408, an STS 410, an application server 412, and a user database 414. A target security layer 404 includes a target web server 416, a target STS 418, a target application server 420, and a target user database 422. The web server 408 and the target web server 416 are used for a client device 406 to initially access a specific security layer. The STS 410 and the target STS 418 authorize access to the respective security layers by generating access tokens for the specific layer that the STS is located on. For example, the STS 410 generates access tokens for the security layer 402 and the target STS 418 generates access tokens for the target security layer 404. The application server 412 and the target application server 420 execute applications for the respective security layers. The user database 414 and target user database 422 store the security credentials for operators that are granted access to the respective security layers.

The web server 408 identifies an operator using a client device 406 to access a target controller in the target security layer 404. In operation 424, the client device 406 attempts to access an application on the target security layer 404. Once the web server 408 receives an attempt to access the application, the web server 408 initiates STS authentication 426 of the client device 406 with the STS 410 in operation 426. The web server 408 communicates with the STS 410 in order to perform operator identification when the client device 406 initially accesses the security layer 402. The web server 408 responds to the access attempt by redirecting the client device 406 to communicate with the STS 410 in operation 428.

The STS 410 authenticates an operator of the client device 406 for accessing an application server 412 in the security layer 402. The STS 410 authenticates the operator of the client device 406 by comparing the operator with an identity in the user database 414 in operation 430. The user database 414 stores the identities of the users with credentials to access the controllers of the security layer 402. Once the STS 410 authenticates the operator with the user credentials, the STS 410 provides an identity token to the client device 406 in operation 432. The client device 406 transmits the identity token to the web server 408 in operation 434. The web server 408 uses the identity token received from the client device 406 and prepares an access token corresponding to the client device 406. The web server 408 provides the access token to the application server 412 in operation 436. The application server 412 uses the access token to communicate with the STS 410 for authentication of the client device 406 for the security layer 402 in operation 438.

Once the client device 406 is authenticated at the application server 412, the application server 412, the application server 412 and the target application server 420 negotiate for the client device 406 to access the target application server 420 in the target security layer 406. The application server 412 transmits the access token to the target application server 420 in operation 440. The target application server 420 access the security layer claims from the access token and maps the security layer claims to the target security layer claims based on the configurations of the security layer 402 and the target security layer 404 in operation 442. The target application server authenticates the client device 406 with the target STS 418 in operation 442. Once the client device 406 is authorized with the target STS 418 on the target security layer 404, the target STS 418 authenticates the client device with the STS 410 in operation 444. The target STS 418 accesses the target layer claims from the access token and maps the security layer claims to target security layer claims based on the configurations of the security layer 402 and the target security layer 404 in operation 446. The target STS 418 reissues the access token as a target access token with the target security layer claims in operation 448. Once the target application server 420 receives the target access token from the target STS 418, the target application server 420 transmits a response to the request to access the controllers of the target security layer 404 in operation 450. The target application server 420 allows the client device 406 access to the controllers of the target security layer 404.

Although FIG. 4 illustrates an example of a secure communication 400 across security layers, various changes may be made to FIG. 4. For example, while a configuration of the components is illustrated in FIG. 4, other embodiments can include more or fewer components.

Figure 5:
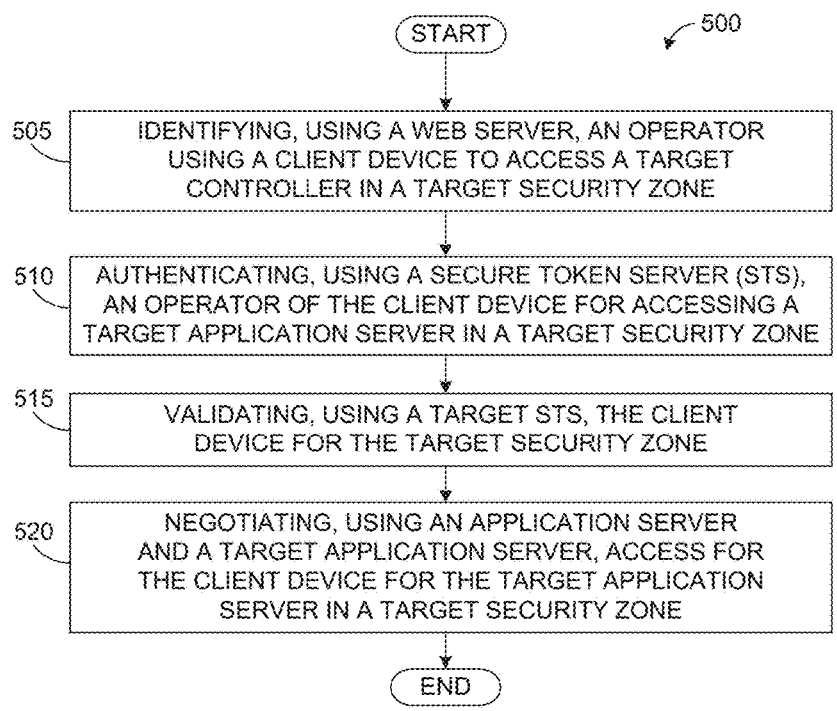
FIG. 5 illustrates an example method for secure communication across security layers in an industrial control system according to this disclosure.

FIG. 5 illustrates an example method 500 for secure communication across security layers according to this disclosure. The process depicted in FIG. 5 is described as being performed in conjunction with the industrial process system 100 illustrated in FIG. 1 using the secure communication 200 of FIG. 2, the secure communication 300 of FIG. 3, or the secure communication 400 of FIG. 4.

In operation 505, a web server identifies an operator using a client device to access a target controller in a target security layer. The client device attempts to access an application on a target security layer. Once the web server receives an attempt to access the application, the web server initiates STS authentication of the client device with the STS. The web server communicates with the STS in order to perform operator identification when the client device initially accesses the security layer. The web server responds to the access attempt by redirecting the client device to communicate with the STS.

In operation 510, an STS authenticates an operator of the client device for accessing an application server in the security layer. The STS authenticates the operator of the client device by comparing the operator with an identity in the user database. The user database stores the identities of the users with credentials to access the controllers of the security layer. Once the STS authenticates the operator with the user credentials, the STS provides an identity token to the client device. The client device transmits the identity token to the web server. The web server uses the identity token received from the client device and prepares an access token corresponding to the client device. The web server provides the access token to the application server. The application server uses the access token to communicate with the STS for authentication of the client device for the security layer. Once the client device is authenticated at the application server, the application server transmits the access token for the security layer to the target STS in the target security layer.

In operation 515, a target STS validates the client device for the target security layer. The target STS receives the access token for the security layer and validates a target access token for the target security layer. The target STS transmits the target access token back to the application server.

In operation 520, the application server and a target application server negotiate for the client device to access a target application server in a target security layer. The application server receives the target access token and transmits the target access token to the target application server. The target application server authenticates the client device with the target STS. Once the target application server receives authentication from the target STS, the target application server transmits a response to the request to access the controllers of the target security layer. The target application server allows the client device access to the controllers of the target security layer.

Although FIG. 5 illustrates one example of a method 500 for secure communication across security layers, various changes may be made to FIG. 5. For example, various steps shown in FIG. 5 could overlap, occur in parallel, occur in a different order, or occur any number of times.

It may be advantageous to set forth definitions of certain words and phrases used throughout this patent document. The terms "transmit," "receive," and "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A security layer in an industrial control and automation system comprising:
   a user database configured to store identities of users with credentials to access one or more controllers in a target security layer;
   a web server configured to identify an operator using a client device;
   a secure token server (STS) configured to authenticate the operator for accessing a target application server in the target security layer;
   a target secure token server (STS) configured to validate the operator for accessing the target security layer, and
   an application server configured to:
      negotiate access for the client device for a target application server in a target security layer;
      provide an access token received from the web server to a target STS located in the target security layer; and receive a target access token from the target STS, wherein the target access token comprises information that authenticates the client device to access the target security layer and allowing the operator on a client device to access the controller of the target security layer.

2. The security layer of claim 1, wherein the web server is further configured to:
communicate with the STS for operator identification when the client device initially accesses the security layer; and
redirect the client device to communicate with the STS.

3. The security layer of claim 1, wherein the STS is further configured to:
authenticate the operator with the identities stored in the user database; and
provide an identity token to the client device.

4. The security layer of claim 1, wherein the web server is further configured to:
receive an identity token from the client device; and
provide an access token for the operator to the application server.

5. The security layer of claim 1, wherein the application server is further configured to communicate with the STS for security layer authentication of the operator using an access token received from the web server.

6. The security layer of claim 1, wherein the application server is further configured to:
provide a target access token to the target application server in the target security layer; and
receive a response to a request from the target application server allowing access for the client device to target controllers in the target security layer.

7. An industrial control and automation system comprising:
a target security layer comprising a target secure token server (STS) and a target application server; and
a security layer comprising:
a user database configured to store identities of users with credentials to access controllers in a target security layer;
a web server configured to identify an operator using a client device;
an STS configured to authenticate the operator for accessing a target application server in the target security layer;
a target secure token server (STS) configured to validate the operator for accessing the target security layer, and
an application server configured to negotiate:
negotiate access for the client device for a target application server in a target security layer;
provide an access token received from the web server to a target STS located in the target security layer; and
receive a target access token from the target STS, wherein the target access token comprises information that authenticates the client device to access the target security layer.

8. The industrial control and automation system of claim 7, wherein the web server is further configured to:
communicate with the STS for operator identification when the client device initially accesses the security layer; and
redirect the client device to communicate with the STS.

9. The industrial control and automation system of claim 7, wherein the STS is further configured to:
authenticate the operator with the identities stored in the user database; and
provide an identity token to the client device.

10. The industrial control and automation system of claim 7, wherein the web server is further configured to:
receive an identity token from the client device; and
provide an access token for the operator to the application server.

11. The industrial control and automation system of claim 7, wherein the application server is further configured to communicate with the STS for security layer authentication of the operator using an access token received from the web server.

12. The industrial control and automation system of claim 7, wherein the application server is further configured to:
provide a target access token to the target application server in the target security layer; and
receive a response to a request from the target application server allowing access for the client device to target controllers in the target security layer.

13. A method for secure communication across security layers, the method comprising:
identifying, using a web server, an operator using a client device to access a target controller in a target security layer;
authenticating, using a secure token server (STS), an operator of the client device for accessing a target application server in the target security layer;
negotiating, using an application server, access for the client device for the target application server in the target security layer
providing an access token received from the web server to a target STS located in the target security layer; and
receiving a target access token from the target STS, wherein the target access token comprises information that authenticates the client device to access the target security layer and allowing the operator on a client device to access the controller of the target security layer.

14. The method claim 13, further comprising:
communicating, using the web server, with the STS for operator identification when the client device initially accesses the security layer;
redirecting, using the web server, the client device to communicate with the STS;
receiving, with the web server, an identity token from the client device; and
providing, with the web server, an access token for the operator to the application server.

15. The method of claim 13, further comprising:
authenticating, using the STS, the operator with the identities stored in a user database; and
providing, using the STS, an identity token to the client device.

16. The method of claim 13, further comprising communicating, using the application server, with the STS for security layer authentication of the operator using an access token received from the web server.

17. The method of claim 13, further comprising:
providing, using the application server, a target access token to the target application server in the target security layer; and
receiving, using the application server, a response to a request from the target application server allowing access for the client device to target controllers in the target security layer.

* * * * *